United States Patent

[11] 3,624,096

| [72] | Inventors | Rudolph A. Abramovitch;<br>George M. Singer, both of Tuscaloosa, Ala. |
|---|---|---|
| [21] | Appl. No. | 837,325 |
| [22] | Filed | June 27, 1969 |
| [45] | Patented | Nov. 30, 1971 |
| [73] | Assignee | Warner-Lambert Company<br>Morris Plains, N.J. |

[54] PROCESS FOR PRODUCING CERTAIN AMIDE DERIVATIVES OF PYRIDINE AND REDUCING SAID AMIDES TO CORRESPONDING AMINES
7 Claims, No Drawings

[52] U.S. Cl.................................................. 260/294.9,
260/295 AM, 260/295.5 A, 260/296 R, 260/287 R, 260/250 A, 260/251 R, 260/309.2, 260/999, 252/401
[51] Int. Cl. ........................................................ C07d 31/46
[50] Field of Search............................................ 260/294.9, 295 AM, 295.5 R, 295.5 A

[56] References Cited
UNITED STATES PATENTS
3,450,707  6/1969  Bailey............................ 260/296

*Primary Examiner*—Alan L. Rotman
*Attorneys*—Albert H. Graddis, Henry E. Millson, Jr., Frank S. Chow, Neil D. Edwards and Anne M. Kelly ABSTRACT: A process is described for the alkylamination or arylamination of five- or six-membered heteroaromatic N-oxides. In the process, a five- or six-membered heteroaromatic N-oxide and an appropriately substituted imidoyl chloride or imidoyl bromide or a nitrilium salt derived therefrom, are heated in an inert polar solvent at reflux temperature for a period of time sufficient to bring the reaction to completion. The amide reaction product, which is thus obtained, is subsequently converted to the amine by conventional hydrolysis procedures.

A PROCESS FOR PRODUCING CERTAIN AMIDE DERIVATIVES OF PYRIDINE AND REDUCING SAID AMIDES TO CORRESPONDING AMINES

BRIEF DESCRIPTION OF THE INVENTION

In carrying out the process of the invention, two equivalents of a five- or six-membered heteroaromatic N-oxide and one equivalent of an appropriately substituted imidoyl chloride or imidoyl bromide or a nitrilium salt derived from such imidoyl halide, are dissolved in a suitable inert polar solvent. The solution is heated at its reflux temperature under anhydrous conditions for a period of time sufficient to effect the amidation reaction. When the reaction has reached completion, the amide reaction product can be recovered from the reaction mixture by conventional procedures and subsequently converted into an amine by hydrolysis using either an acid or an alkali,. In the alternative, the amide reaction product, without first having been isolated, can be converted by hydrolysis into the amine using either an acid or an alkali as the hydrolyzing agent.

DETAILED DESCRIPTION

The present invention provides a practical and commercially feasible method for producing compounds of the formula:

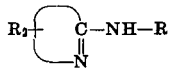   I in which the symbol R represents an alkyl group or an aryl group and in which the symbol $R_2$ represents hydrogen, an alkyl group, a carboxy group, an ester group, or a halogen atom.

In formula I, as well as in formulas II and IV which follow, the five- and/or six-membered heteroaromatic moiety is depicted in the following manner:

In the process, two equivalents of a five- or six-membered heteroaromatic N-oxide having the formula:

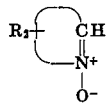   II in which the symbol $R_2$ represents hydrogen, an alkyl group, a nitrile group, an ester group or a halogen atom is reacted under the conditions described hereinafter with one equivalent of either (a) an imidoyl halide having the formula:

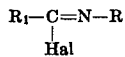   III(a)

in which the symbol R has the same meaning as in formula I; in which the symbol $R_1$ represents an alkyl or an aryl group; and in which Hal represents a chlorine atom or bromine atom or (b) a nitrilium salt having the formula:

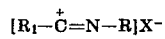   III(b)

in which the symbols R and $R_1$ have the same meanings as in formula III(a) and in which the symbol $X^-$ represents $BF_4^-$, $SbCl_6^-$, $AlCl_4^-$, $FeCl_4^-$, $TiCl_5^-$, $BiCl_4^-$. The product which is obtained by the reaction of the formula II compound with either the formula III(a) or III(b) compound is an amide having the formula:

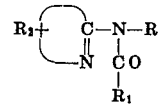   IV in which the symbols R, $R_1$ and $R_2$ have the same meanings as in formulas II, III(a) and III(b).

By conventional acid or alkaline hydrolysis procedures, the formula IV amides, either isolated or not, can be converted into amines having the formula:

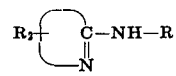   I in which the symbols R and $R_2$ have the same meanings as in formulas I, III(a) and III(b).

The imidoyl chlorides and imidoyl bromides of formula III(a) and the nitrilium salts of formula III(b), which are used as starting materials in the practice of this invention, are prepared by conventional prior art procedures. In one such procedure, a compound having the formula:

$$R_1\text{-CO-NH-R} \qquad V$$

in which the symbols R and $R_1$ have the same meanings as in formulas III(a) and III(b)

is reacted with phosphorus pentachloride, phosphorus pentabromide or thionyl chloride to yield the imidoyl halide of formula III(a). The latter compound can be converted into the nitrilium salt of formula III(b) by conventional methods. In one such method, the imidoyl chloride or imidoyl bromide is dissolved in an appropriate solvent and stirred at room temperature under anhydrous conditions. One equivalent of an appropriate Lewis acid is added to the solution in a dropwise fashion to cause the immediate precipitation of the nitrilium salt. The salt, thus produced, can be isolated by filtration or it can be used in situ.

Exemplary of the imidoyl halides suitable for use in the process are benzanilide imidoyl chloride, benzylbenzimidoyl chloride, N-p-tolylbenzimidoyl chloride, N-p-chlorophenyl benzimidoyl chloride, N-p-nitrophenylbenzimidoyl chloride, α-chlorobenzylidene-p-nitroaniline, α-chlorobenzylidene-2-methylaniline, etc. It is to be understood that the foregoing listing is illustrative only of the compounds which can be used in the practice of the invention. In general, any active imidoyl chloride or imidoyl bromide, or any nitrilium salt derived therefrom by the method heretofore described, can be employed in the practice of this invention.

The five- or six-membered heteroaromatic N-oxides of formula II are also known compounds. Exemplary of such compounds are pyridine N-oxide, 2-methylpyridine N-oxide, 3-methylpyridine N-oxide, 4-methylpyridine N-oxide, 3-cyanopyridine N-oxide, methyl nicotinate N-oxide, 1-benzylbenziminazole 3-oxide, 1-alkylbenzimidazole 3-oxides, as well as quinoline N-oxides and isoquinoline N-oxides, pyrimidine N-oxides, pyridazine mono-N-oxides, pyrazine mono-N-oxides, etc.

The process of the invention is carried out with the anhydrous imidoyl chloride or bromide of formula III(a) or the anhydrous nitrilium salt of formula III(b) and the heteroaromatic N-oxide of formula II dissolved in a suitable solvent. A single solution containing both reactants can be prepared or separate solutions, using the same solvent, can be produced and combined. In general, any inert organic solvent which is polar in nature can be employed in producing the solution or solutions. However, for obvious reasons, the solvent selected for use must have a boiling point which is higher than the temperature at which the compound of formula III(a) or III(b)

reacts with the compound of formula II. Although inert polar solvents, in general, are suitable for use, especially well suited for use are solvents, such as, methylene chloride, ethylene chloride and chlorobenzene. The quantity of solvent employed in producing the solution of the formulas III(a) and III(b) compounds is not particularly critical. Obviously, the solvent must be present in an amount which is sufficient at least to dissolve reactants at the reaction temperature.

The organic solvent solution containing the formula III(a) or III(b) compound and the heteroaromatic N-oxide of formula II is heated, generally at reflux, in the absence of moisture. The reaction time is variable depending primarily upon the reactivity of the particular reactants and the reflux temperature of the reaction mixture. As a general rule, the reaction will be brought to completion in any particular instance by heating the reaction mixture at reflux for a period of from about 1 to 12 hours.

The reaction of the compound of formula III(a) or III(b) with the compound of formula II results in the production of an amide of formula IV. Such amides are readily converted into the amines of formula I by hydrolysis. The amide can be isolated from the reaction mixture prior to conversion to the amine or it can be converted to the amine without having been isolated. In the conversion of the amide to the amine, conventional procedures are employed. Thus, for example, the hydrolysis is effected at an elevated temperature using either an acid or alkali as the hydrolyzing agent. In one specific embodiment of the invention, the conversion can be carried out by boiling the amide of formula IV in 2N hydrochloric acid for a period of about 3 hours. In an alternate embodiment, the conversion can be accomplished by boiling the amide in 5 percent aqueous sodium hydroxide, although in such embodiment the complete conversion of amide to amine may require a longer heating period.

Certain of the amines of formula I are useful as intermediates for the production of known compounds of acknowledged utility. Certain of the amines are useful per se, that is, they have utility other than as intermediates. Thus, for example, 2-anilinopyridine, which is produced in the practice of this invention, has been coupled with 5-nitrothiazole diazonium ion to form a dye. Additionally, the compound has been disclosed as useful as an oxidation inhibitor in high temperature ester lubricants. Moreover, the invention can be utilized as a means for producing certain known p-substituted 2-anilinopyridines. For example, 2-p-toluidino-pyridine and 2-(p-chloroanilino)-pyridine can be produced by the present process. These compounds have been described in the literature as moderately effective mono-amine oxidase inhibitors. Furthermore, the present process can be used to produce 2-anilino-4-picoline and 6-anilino-2-picoline. The conversion of those components into N-phenyl-N-picolyl-dialkylaminoalkylamines, compounds possessing anticholinergic and ganglia blocking agents activity, is described in the literature. Additionally, 2-p-methoxyanilino and 2-p-chloroanilinopyridine, both of which can be produced by the present process, are disclosed in the literature as being intermediates for the synthesis of 1-phenyl-1-pyridyl derivatives of urea and 3-alkyl ureas to which cardioregulatory properties have been ascribed. Furthermore, the process of this invention can be used to prepare 2-(N-benzylamino)-4-picoline and 2-anilinoquinoline, both of which have been disclosed in the literature as exhibiting oxidation inhibition activity when present in low concentrations in high temperature ester lubricants. Additionally, the process of the invention can be utilized to produce 2-(β-hydroxy-benzethylaminopyridine). Finally, a number of the substituted 2-anilaino-3-nitropyridines which can be produced by the present process, are useful as dyes for synthetic fibers. The compounds show an ultraviolet absorption maxima in the 355–420 mμ range.

For a fuller understanding of the nature and objects of this invention, reference may be had to the following examples which are given merely as further illustrations of the invention and are not to be construed in a limiting sense.

EXAMPLE 1

In this example, 2.45 grams (0.0114 mol) of benzanilide imidoyl chloride and 2.17 grams (0.0228 mol) of pyridine N-oxide were added to, and dissolved in, 20 ml. of ethylene chloride. The solution was heated at reflux temperature for a period of about 10 hours under an atmosphere of dry nitrogen. At the end of the heating period, the solution was cooled and, on cooling, pyridine N-oxide hydrochloride (1.10 gram or 42 percent of theory) separated. The separated hydrochloride salt was thereafter removed from the solution by filtration. The filtrate was then evaporated under vacuum and the residue was fractionally crystallized from aqueous ethanol. There was, thus obtained, N-benzoyl-N-2-pyridylaniline in a yield of 1.46 grams or 46.5 percent of theory, having a melting point at 165° C. to 166° C.

The N-benzoyl-N-2-pyridylaniline, obtained as described in the preceding paragraph, can be converted into 2-anilinopyridine by hydrolysis using conventional acid or alkaline hydrolyzing agents.

EXAMPLE 2

In this example, 2.15 grams (0.01 mol) of benzanilide imidoyl chloride was added to 25 ml. of ethylene chloride and, with stirring, the solution was heated at reflux temperature in an atmosphere of dry nitrogen. To the refluxing solution there was added a solution of 1.9 grams (0.02 mol) of pyridine N-oxide in 15 ml. of ethylene chloride. The addition was carried out in a dropwise fashion over a period of about 10 minutes. When the addition of the solution of pyridine N-oxide was completed, the reaction mixture was heated at reflux temperature for a period of about 4½ hours. At the end of that time, the reaction mixture was cooled and, on cooling, pyridine N-oxide hydrochloride separated. By filtration, there was obtained 0.54 gram or 41 percent of theory of pyridine N-oxide hydrochloride, melting point at 178° C. to 183° C. The filtrate was subsequently evaporated under vacuum and the residue was hydrolyzed by boiling same for a period of about 15 minutes with 50 ml. of a 5 percent aqueous sodium hydroxide solution. The reaction mixture was thereafter subjected to steam distillation and there was obtained 1.26 gram (70 percent of theory) of 2-anilinopyridine, melting point at 106° C. to 108° C.

EXAMPLE 3

In this example, 4.22 grams (0.02 mol) of benzylbenzamide and 4.16 grams (0.02 mol) of phosphorus pentachloride were admixed and heated at reflux temperature until the evolution of hydrogen chloride ceased. This was accomplished by heating for a period of about 30 minutes. The reaction mixture was subjected to vacuum distillation at room temperature to remove phosphorus oxychloride, benzonitrile, benzyl chloride and any residual hydrogen chloride present therein. There was, thus obtained, a yield of 3.33 grams (70 percent of theory) of benzylbenzimidoyl chloride.

3.33 Grams (0.0144 mol) of benzylbenzimidoyl chloride, produced as described in the preceding paragraph, and 2.74 grams (0.0288 mol) of pyridine N-oxide were charged into a reaction vessel and the mixture was heated at reflux temperature in 25 ml. of ethylene chloride in an atmosphere of dry nitrogen for a period of about 5 hours. At the end of the heating period, the reaction mixture was cooled to room temperature and, upon cooling, pyridine N-oxide hydrochloride (1.42 grams or 72 percent of theory) crystallized. The crystalline salt was removed by filtration, following which the filtrate was evaporated under vacuum. The residue was then hydrolyzed by boiling with 25 ml. of 2N hydrochloric acid. The solution was then extracted with ether, following which the ether was removed by evaporation. The residue was then recrystallized from aqueous ethanol to obtain 0.67 gram of benzylbenzamide. The aqueous layer was thereafter treated with 5 percent aqueous sodium hydroxide solution to obtain 0.45 gram, or 50 percent of theory, of 2-benzylaminopyridine, which had a melting point at 83° C. to 87° C.

In another experiment, the residue, obtained by the evaporation of the ethylene chloride, was crystallized from ethanol to yield 0.41 gram, or 57 percent of theory, of N-benzoyl-N-2-pyridylbenzylamine, having a melting point at 106.5° C. to 112° C. Recrystallization from ethanol yielded N-benzoyl-N-2-pyridylbenzylamine, melting point at 111° C. to 113° C.

Calculated for $C_{19}H_{16}N_2O$
Calcd: C 79.14  H 5.59
Found: C 79.45  H 5.95

EXAMPLE 4

In this example, a solution of 1.90 grams (0.02 mol) of pyridine N-oxide and 2.60 grams (0.01 mol) of α-chlorobenzylidene-p-nitroaniline in 20 ml. of chlorobenzene was prepared. The solution was heated at reflux temperature for a period of about 9½ hours under an atmosphere of dry nitrogen. At the end of the heating period, the reaction mixture was cooled and a small amount of pyridine N-oxide hydrochloride, melting point at 167° C. to 173° C., crystallized. The crystalline salt was removed by filtration, following which the filtrate was evaporated to dryness under vacuum. The residue, obtained upon removal of the solvent, was hydrolyzed by heating it with 25 ml. of a 5 percent aqueous sodium hydroxide solution. The reaction mixture was then cooled and a yellow crystalline product came out of solution. The crystals were collected by filtration in a yield of 1.10 gram, melting point at 125° C. to 135° C. The crystalline product was then recrystallized from methanol. There was, thus obtained, 0.88 grams (41 percent of theory) of N-2-pyridly-p-nitroaniline melting point at 160° C. to 172° C. An additional crystallization of the product from methanol yielded N-2-pyridyl-p-nitroaniline, melting point at 174° C to 175° C.

EXAMPLE 5

In this example, 3.29 grams (0.0132 mol) of p-chlorophenylbenzimidoyl chloride and 2.51 grams (0.0264 mol) of pyridine N-oxide were heated at reflux temperature in 20 ml. of chlorobenzene in an atmosphere of dry nitrogen for a period of about 10 hours. At the end of that time, the reaction mixture was cooled to room temperature. The solvent was removed by distillation in vacuo and an oily residue was obtained. The residue was heated at reflux temperature with 40 ml. of 2N hydrochloric acid for a period of about 9 hours, following which it was cooled to room temperature and filtered. The filtrate was made alkaline using 5 percent aqueous sodium hydroxide and it was allowed to stand overnight at room temperature. The mixture was thereafter filtered to recover 1.4 grams (53 percent of theory) of 2-p-chloroanilinopyridine which had precipitated. Upon recrystallization of the product from ethanol, there was obtained 1.21 grams of 2-p-chloroanilinopyridine, melting point at 113° C. to 114° C.

EXAMPLE 6

In this example, a solution of 1.90 grams (0.02 mol) of pyridine N-oxide and 2.60 grams (b 0.01 mol) of p-nitrophenylbenzimidoyl chloride in 30 ml. of chlorobenzene was heated at reflux temperature for a period of 9.5 hours under an atmosphere of dry nitrogen. The reaction mixture was subsequently cooled to room temperature and filtered. The filtrate was evaporated in vacuo and the residue was heated at reflux temperature with 5 percent aqueous sodium hydroxide. On cooling, the mixture was filtered to obtain 2.2 grams of 2-p-nitroanilinopyridine, melting point at 125° C. to 135° C., which had precipitated. Upon recrystallization of the product two times from methanol, 2-p-nitroanilinopyridine was obtained in the form of yellow needles, melting point at 174° C. to 175° C.

EXAMPLE 7

In this example, a solution of 1.76 grams (0.0068 mol) of p-nitrophenylbenzimidoyl chloride was dissolved in 30 ml. of ethylene chloride. The solution was stirred at room temperature and, while stirring continued, there was added, in a dropwise fashion, 2.0 grams (0.0068 mol) of antimony pentachloride. The solution assumed a deep orange color. To this solution there was added, in a dropwise fashion, a solution of 1.29 grams (0.0136 mol) of pyridine N-oxide in ethylene chloride. A precipitate formed but it redissolved in the solvent. The solution became pale orange in color. Stirring was discontinued and the solution was heated at reflux temperature for a period of about 17 hours. At the end of that period of time, the solvent was removed in vacuo and the residue was heated at reflux temperature with 30 ml. of 2N hydrochloric acid for a period of 2 hours. The reaction mixture was cooled to room temperature, following which it was filtered to collect the precipitated product. Upon treatment of the precipitate with an alkali, there was obtained 1.30 grams (89 percent of theory) of 2-p-nitroanilinopyridine, melting point at 170° C. to 175° C.

EXAMPLE 8

In this example, 1.21 grams (0.005 mol) of 1-benzyl-benzimidazole 3-oxide was azeotroped with two 10 ml. portions of chloroform. A solution of 0.54 grams (0.0015 mol) of N-phenylbenzimidoyl chloride in 10 ml. of chloroform was added and the solution, thus obtained, was heated at reflux temperature for a period of about 22 hours. At the end of that period of time, the solution was evaporated to dryness and the residue was dissolved in ethanol. Upon decolorization, addition of water and seeding, there was obtained 900 mg. of N-(1-benzyl-2-benzimidazolyl)-benzanilide, melting point at 142° C. to 143° C. Recrystallization of the compound from methanol raised the melting point of the compound to within the range of from about 151.5° C. to 153.5° C.

EXAMPLE 9

In this example, a mixture of 13.7 grams (0.063 mol) of benzanilide imidoyl chloride, 15.2 grams (0.126 mol) of 3-cyanopyridine N-oxide and 125 ml. of chlorobenzene was prepared and heated at reflux temperature for a period of about 10 hours under an atmosphere of dry nitrogen. At the end of that period of time, the resulting solution was cooled to a temperature of about 25° C. and filtered. The filtrate was distilled under vacuum to remove chlorobenzene following which the residue was taken up in chloroform. The chloroform solution was washed two times with water, dried over magnesium sulfate and filtered. The filtrate was then distilled to remove chloroform. The residue was recrystallized, first from 30 ml. of ethanol and thereafter from 150 ml. of methanol. The crystalline product, thus obtained, was 2-(N-benzoylanilino)-5-cyanopyridine, melting point at 154° C. to 156° C.

One and five-tenths Gram (0.005 mol) of 2-(N-benzoylanilino)-5-cyanopyridine, produced as described in the preceding paragraph, 2.0 grams of 50 percent aqueous sodium hydroxide and 10 ml. of ethylene glycol were combined and heated at reflux temperature for a period of about 90 minutes. At the end of that period of time, the solvent was removed by distillation under vacuum on a steam bath, following which the residue was dissolved in 30 ml. of water. Sufficient concentrated hydrochloric acid was added to the aqueous solution to adjust the solution to a pH of 4.0. A precipitate was formed and it was collected and dried. The collected product had a melting point of 126° C. to 241° C. This product was slurried with 15 ml. of boiling methanol and the slurry was filtered while hot. There was, thus obtained, 2-anilino-5-carboxypyridine, melting point at 263° C. to 267° C.

EXAMPLE 10

IN this example, 61.7 grams (0.234 mol) of α-chlorobenzylidine-2-methyl-3-chloroaniline, 56.0 grams (0.468 mol) of 3-cyanopyridine N-oxide and 660 ml. of 1,2-dichlorobenzene were admixed and heated at a temperature of about 130° C. for a period of about 10 hours under a nitrogen atmosphere. At the end of that period of time, the reaction mixture was cooled to a temperature of about 25° C., following which it was filtered.

The filtrate, thus obtained, was distilled under vacuum to remove dichlorobenzene. The residue was treated successively with 370 ml. of ether, 40 ml. of nitromethane and 55 ml. of 95 percent ethanol. Upon filtration, there was obtained 25.2 grams of 2'-methyl-3'-chlorobenzanilide. The filtrate was thereafter evaporated to dryness and the residue (39.4 grams) was admixed with 40.0 grams of 50 percent aqueous sodium hydroxide and 400 ml. of ethylene glycol and the mixture was heated at reflux temperature for a period of about 2 hours. At the end of that period of time, the solvent was removed by distillation under vacuum and the residue, thus obtained, was dissolved in water. The aqueous solution was adjusted to a pH of 5.0 using concentrated hydrochloric acid, following which it was extracted with chloroform. The chloroform extract was dried over magnesium sulfate and filtered. Thereafter, the filtrate was distilled to remove the chloroform. The residue was slurried with 110 ml. of hot acetonitrile and, upon filtration, there was obtained an isomeric mixture, melting point at 197° C. to 201° C. comprising 2-(2'-methyl-3'-chloroanilino)-3-carboxypyridine and 2-(2'-methyl-3'-chloroanilino)-5-carboxypyridine.

Three and fifteen hundredths Grams of the isomeric mixture, obtained as described in the preceding paragraph, were recrystallized twice from acetic acid and there was obtained 2-(2'-methyl-3'-chloroanilino)-3-carboxypyridine melting point at 238° C. to 240° C. The acetic acid liquors were subsequently concentrated and the resulting residue was recrystallized from isopropyl alcohol to obtain 2-(2'-methyl-3'-chloroanilino)-5-carboxypyridine, melting point at 233° C. to 235° C.

We claim:

1. A process for the production of an amide having the formula:

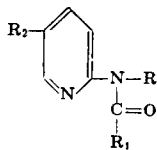

In which the symbol R represents phenyl, benyl, p-tolyl, p-chlorophenyl or p-nitrophenyl; the symbol R, represents phenyl; the symbol R2 represents hydrogen, methyl, chloro, cyano or carboxymethyl, which consists of reacting an imidoyl chloride of the formula:

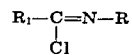

in which the symbol R represents phenyl, benzyl, p-tolyl, p-chlorophenyl, or p-nitro phenyl; the symbol R1 represents phenyl with a pyridine-N-oxide having the formula:

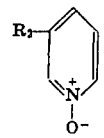

in which the symbol R2 represents hydrogen, halogen, cyano or carboxymethyl.

2. A process of claim 1 wherein, in an additional step, the amide reaction product is hydrolized to an amine having the formula:

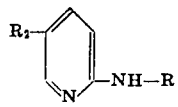

in which the symbol R represents, phenyl, benzyl, p-chloro phenyl or p-nitro phenyl and the term R2 represents hydrogen, methyl carboxyl, halogen or carboxymethyl by heating said amide reaction product at refleux temperature with an acid or alkali.

3. The process of claim 1 wherein reactant (a) is an imidoyl chloride.

4. The process of claim 1 wherein reactant (b) is pyridine N-oxide.

5. The process of claim 1 wherein reactant (b) is 3-cyanopyridine N-oxide.

6. The process of claim 1 wherein reactant (a) is benzanilide imidoyl chloride.

7. The process of claim 1 wherein reactant (a) is benzylbenzimidoyl chloride and wherein the reaction product is subsequently hydrolyzed by heating with hydrochloric acid.

* * * * *